(12) United States Patent
Biswas et al.

(10) Patent No.: US 6,861,036 B2
(45) Date of Patent: Mar. 1, 2005

(54) CHARGING AND CAPTURE OF PARTICLES IN CORONAS IRRADIATED BY IN-SITU X-RAYS

(75) Inventors: Pratim Biswas, Chesterfield, MO (US); Norikazu Namiki, Ishikawa (JP); Pramod Kulkarni, St. Louis, MO (US)

(73) Assignee: Washington University in St. Louis, St. Louis, MO (US)

( * ) Notice: Subject to any disclaimer, the term of this patent is extended or adjusted under 35 U.S.C. 154(b) by 0 days.

(21) Appl. No.: 10/237,268

(22) Filed: Aug. 30, 2002

(65) Prior Publication Data

US 2004/0042151 A1 Mar. 4, 2004

(51) Int. Cl.$^7$ ............................................. B01J 19/08
(52) U.S. Cl. .................. 422/186.04; 422/186; 422/121; 204/164; 96/16; 95/57
(58) Field of Search .......................... 422/186.04, 186, 422/121; 204/164; 96/16; 95/57

(56) References Cited

U.S. PATENT DOCUMENTS

| 3,653,185 | A | * | 4/1972 | Scott et al. ..................... 96/16 |
| 3,984,296 | A | | 10/1976 | Richards ................... 204/157.1 |
| 4,070,163 | A | | 1/1978 | Kolb et al. ..................... 55/11 |
| 5,973,904 | A | * | 10/1999 | Pui et al. ..................... 361/225 |
| 6,149,717 | A | | 11/2000 | Satyapal et al. ............... 96/16 |
| 6,187,271 | B1 | * | 2/2001 | Lee et al. ................... 422/121 |

OTHER PUBLICATIONS

Fuchs, N.A., "On the Stationary Charge Distribution on Aerosol Particles in a Bipolar Ionic Atmosphere", *Geofis. Pura Appl.*, 1963, 56, 185–193.

* cited by examiner

*Primary Examiner*—Kishor Mayekar
(74) *Attorney, Agent, or Firm*—Woodcock Washburn LLP

(57) ABSTRACT

An improved method for charging ultrafine particles in coronas (e.g., unipolar or bipolar corona discharges) by exposing the particles to X-ray irradiation. Experimental tests have verified that positive corona in the presence of X-ray irradiation results in maximum or optimum charging efficiency, followed by a negative corona in the presence of X-ray irradiation, X-ray radiation only (without corona), negative corona only (without X-ray irradiation), and finally positive corona only (without X-ray irradiation). This method and system is particularly well suited for use with bioaerosol particles wherein exposure to the corona discharge and X-ray irradiation serves to both capture and inactivate the bioaerosol particles using a single device.

31 Claims, 13 Drawing Sheets

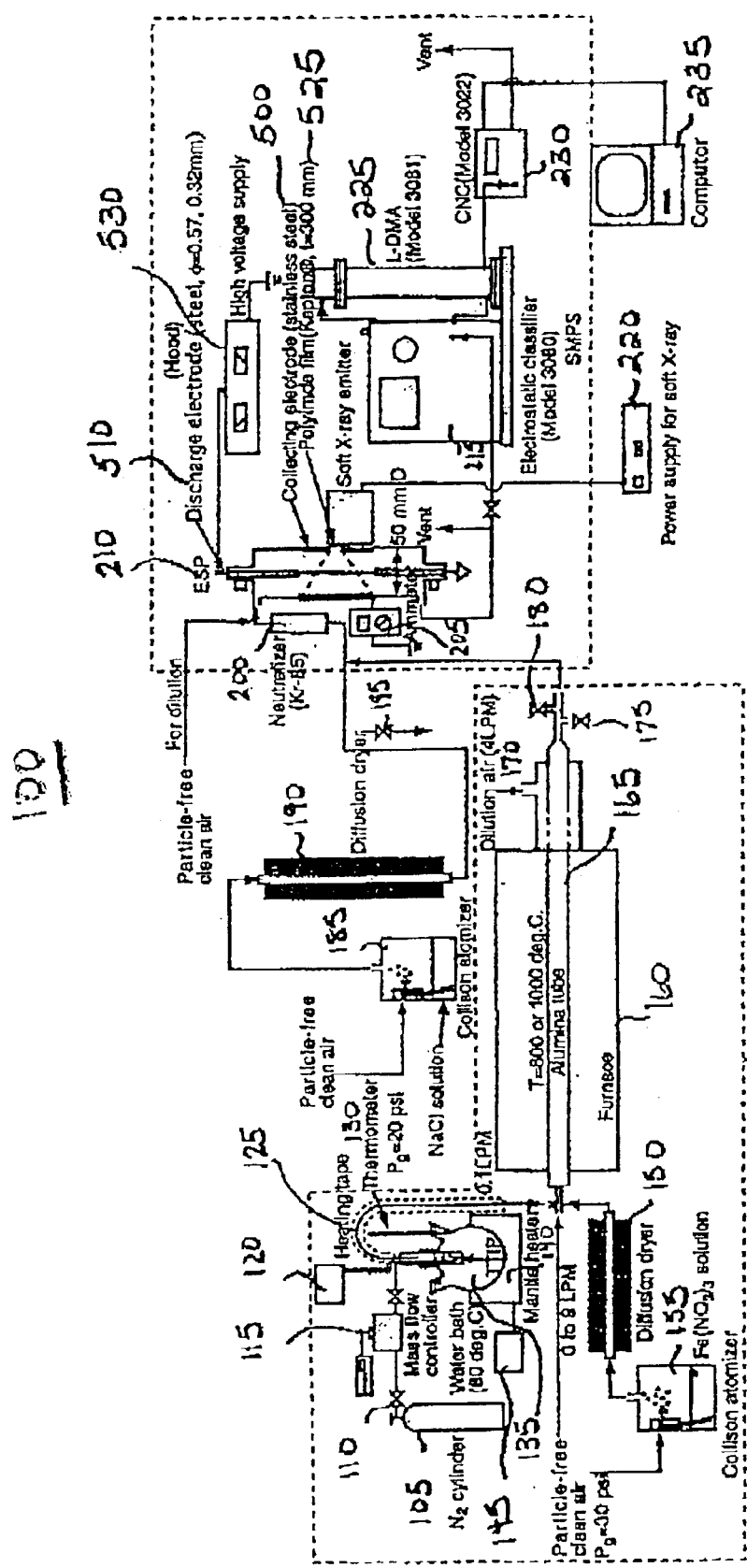
FIG. 1(a)   Schematic diagram of the experimental setup for particle collection of ESP with soft X-ray irradiation.

- X-ray ON, DE: negative potential
- X-ray OFF, DE: negative potential
- X-ray ON, DE: positive potential
- X-ray OFF, DE: positive potential

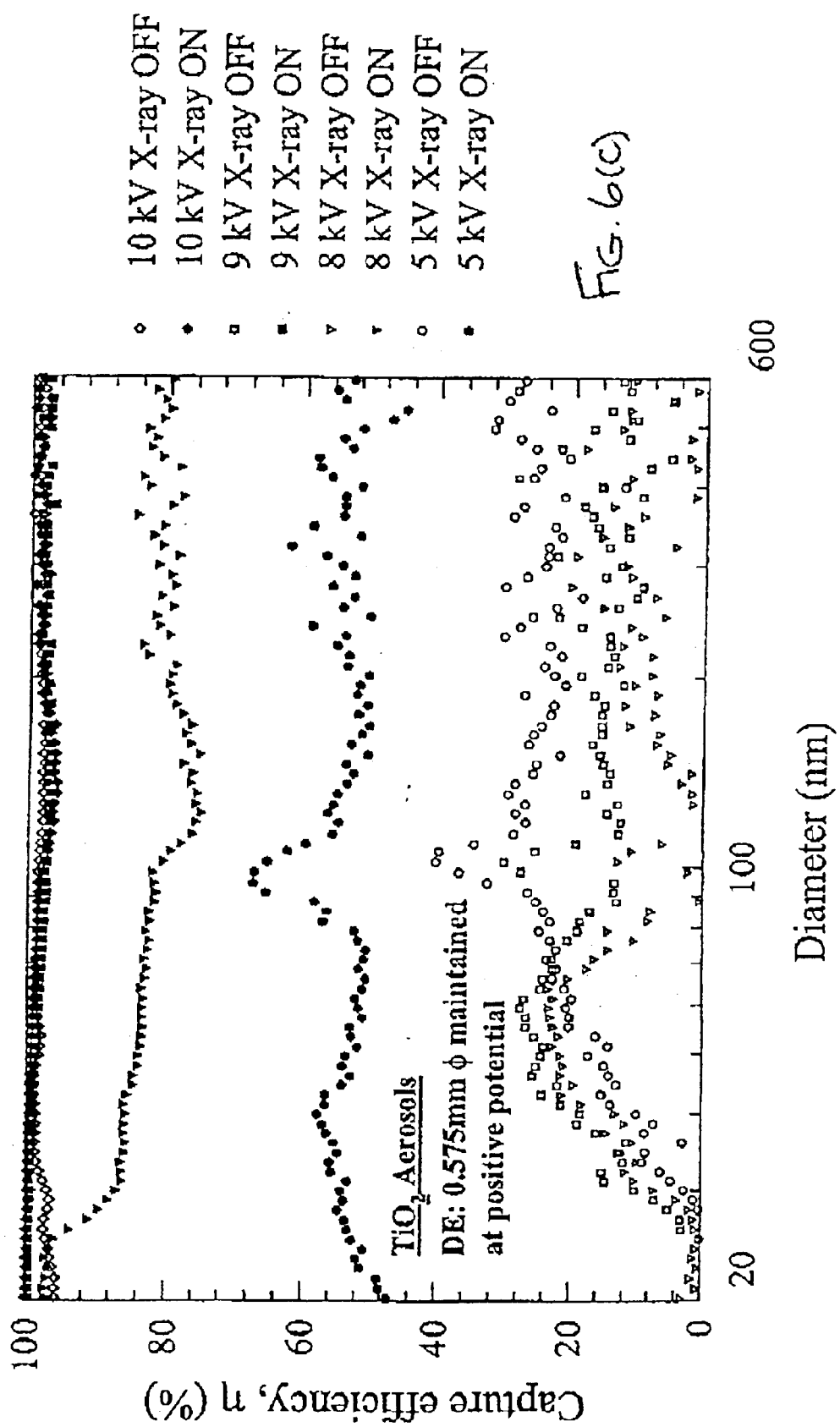

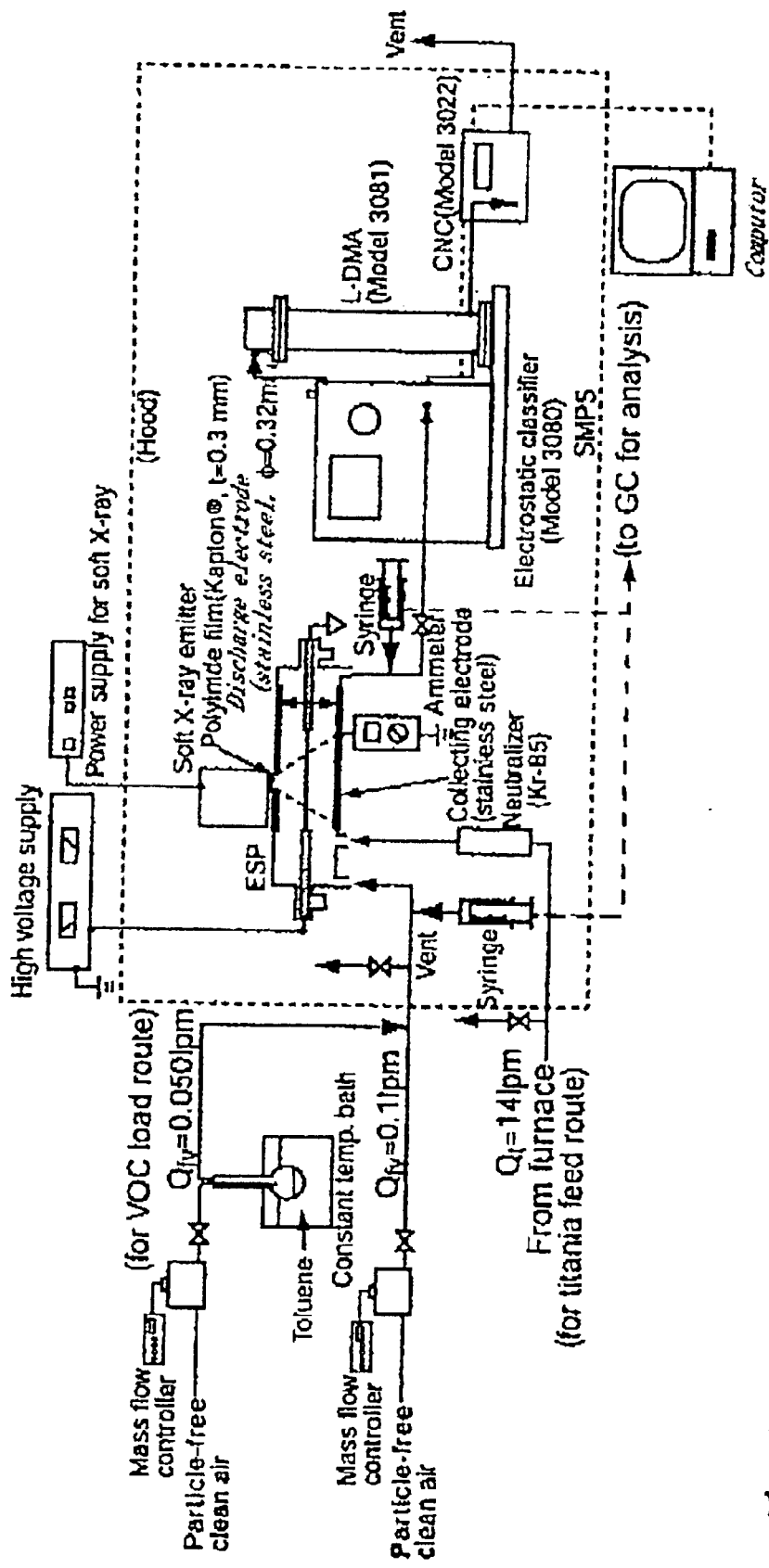
Fig. 8 Schematic diagram of the experimental setup for VOC degradation by soft-X-ray irradiated titania in ESP.

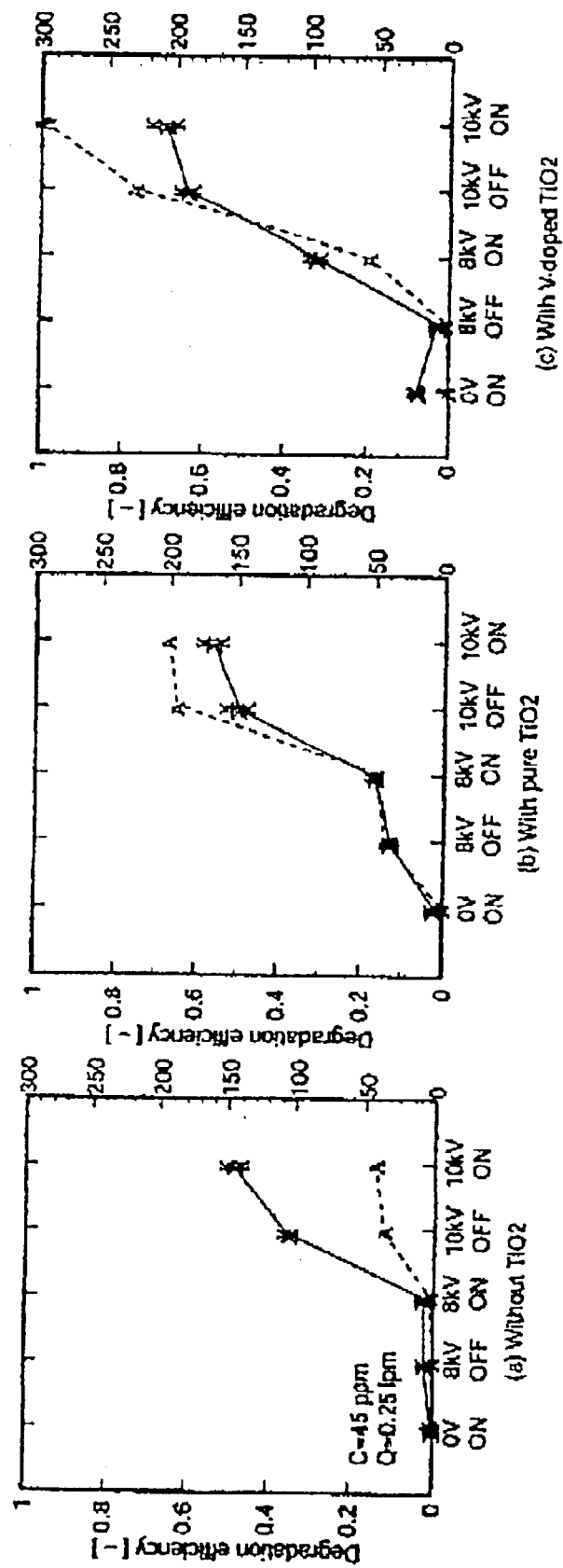
Figs. 9(a)-9(c) Comparison of degradation efficiency for toluene.

CHARGING AND CAPTURE OF PARTICLES IN CORONAS IRRADIATED BY IN-SITU X-RAYS

FIELD OF THE INVENTION

The present invention is related to ultrafine particles and, in particular, to the charging of ultrafine particles to improve their capture efficiency. In a particular application, the invention relates to the inactivation of particles (such as bioaerosols) during and after capture.

BACKGROUND OF THE INVENTION

There has been a renewed interest in the capture of fine particles with the recent promulgation of the Environmental Protection Agency's new Particulate Matter Standard (PM 2.5). Ultrafine particles are defined as particles smaller than approximately 0.5 micrometers. Recently, ultrafine particles in the atmosphere are receiving significant attention due to their potential deleterious health effects. Ultrafine particles may act as condensation nuclei for formation of secondary aerosols in the atmosphere and may also enhance condensation of toxic gaseous species onto their surfaces. Furthermore, ultrafine particles have long atmospheric residence times and contribute significantly to visibility degradation. With the recent issuance by the United States Environmental Protection Agency (USEPA) of the new set of stricter regulations (PM 10), more emphasis is now being concentrated on the control of the finer size fraction of the particles. The USEPA is preparing to adopt the PM 2.5 standard, however many recent studies are alluding to the fact that PM 1 and smaller submicrometer sized particles may have enhanced deleterious health effects.

Electrostatic precipitators (ESPs) are particulate control devices widely used in industry to capture ultrafine particles from air emissions. An ESP operates by imparting an electrostatic charge and passing the particles through an electrostatic field that drives the particles to a collecting electrode where they are collected and removed from the device. The overall mass based efficiency of ESPs is of the order of approximately 99%. When represented graphically, a collection efficiency curve is U-shaped and has a penetration window in the submicrometer size range where the efficiencies are as low as approximately 70%–80%. This range of reduced or lower efficiency is attributable to the balance between two opposing effects. On the one hand is the decreasing charge with decreasing particle size, while on the other hand is increasing drag with increasing particle size. Moreover, contrary to theoretical considerations, experimental observations have shown that collection efficiency decreases with decreasing diameters below approximately 60 nm. Low capture efficiencies have been primarily attributed to partial charging of ultrafine particles.

Various studies have been conducted to investigate the charging of ultrafine particles. Pauthenier, M. M. and Moreau-Hanot in the publication entitled "Charging of Aerosol Particles in an Ionizing Field", *J. Phys. Raidum*, Vol. 7, pp. 290–613 (1932), developed an expression for field charging of particles larger than approximately 0.5 micrometers. Fuchs, N. A., "On the Stationery Charge Distribution on Aerosol Particles in a Bipolar Ionic Atmosphere", *Geofis. Pura Appl.*, Vol. 56, p. 185 (1963), provides equations for calculating particle charging based on the diffusional charging theory. Experimental studies have confirmed that Fuch's theory reasonably predicts the ultrafine particle charging probabilities. In conventional ESP operation (without X-ray irradiation), particles are charged by the corona generated by a relatively high DC voltage applied across the electrodes.

Unipolar corona charging is inadequate to charge the ultrafine particles efficiently. Research has been attempted to enhance the charging of the ultrafine particles by using photoelectric charging processes such as ultraviolet radiation with limited success. X-ray photoionization has been used by researchers for a variety of applications other than charging of ultrafine particles. In particular, soft X-ray ionization has been used to study fragmentation of molecules and a variety of other spectroscopic applications. Photoionization systems have also been used as effective charge neutralizers of surfaces. It would be beneficial to develop a more efficient process for the charging of ultrafine particles.

One particular application or area of significant recent interest is the removal of biological particles from air streams (such as bacteria, viruses, pathogens). Of extreme interest is the capture and inactivation of bioaerosols used as toxic bioagents. Several conventional methods, for example, ultraviolet light, chemical oxidants, and thermal treatment, have been used to inactivate biological agents. However, these conventional processes require a separate device to capture the bioaerosols prior to inactivation. It would therefore be beneficial to simultaneously capture and inactivate bioaerosols using a single device.

It is desirable to improve photoionization and the efficiency of charging of ultrafine particles in unipolar corona by using an X-ray spectrum to irradiate the particles and electrode surfaces in-situ. In a particular application, it would be advantageous to design a single device for the simultaneous capture and inactivation of bioaerosol particles.

SUMMARY OF THE INVENTION

The present invention is a system and method for charging of particles in coronas (e.g., unipolar or bipolar coronas) irradiated by in-situ X-rays.

For the purposes of this application the term "X-rays" is defined as in the range from approximately 0.01 nm to approximately 1.0 nm. Within this X-ray spectral range is a preferred range of "soft X-rays" ranging in wavelength between approximately 0.13 nm and approximately 0.41 nm.

Unipolar corona discharge refers to when one electrode (active electrode) is connected to the power supply while the other electrode (passive electrode) is connected to ground. The unipolar corona discharge may be classified as being either positive or negative based on the polarity of the active electrode. Bipolar corona discharge is when one electrode is connected to a positive power supply while the other electrode is connected to a negative power supply.

An embodiment of the present invention is directed to a method for enhanced charging of aerosol particles in a discharge corona generated in an electrostatic precipitator having a discharge electrode and a collecting electrode. Aerosol particles are received in the electrostatic precipitator. A voltage is applied between the electrodes of the electrostatic precipitator to generate the discharge corona. Simultaneously, the aerosol particles are irradiated in situ of the electrostatic precipitator with X-rays generated by an X-ray emitter. Exposure of the aerosol particles to the X-ray irradiation in the electrostatic precipitator enhances the charging efficiency of the aerosol particles.

Another embodiment of the invention relates to a system for carrying out the above described method. In particular, the system includes an electrostatic precipitator for receiving the aerosol particles. The electrostatic precipitator has a discharge electrode and a collecting electrode, wherein the collecting electrode has a hole defined therethrough. A power source is used to apply an electric field between the discharge and collecting electrodes to generate a discharge corona. X-rays are generated by an X-ray emitter disposed so that the aerosol particles are irradiated by the X-rays in situ through the hole defined in the collecting electrode.

In a particular application of the present invention, the method and system described above are used to simultaneously capture and inactivate bioaerosol particles. Specifically, the X-ray irradiation of the bioaerosol particles not only serve to capture the particles but the X-rays and corona discharge also serve the dual purpose of inactivating the bioaerosol particles. In this particular application, the interior walls of the electrostatic precipitator a preferably coated with a photocatalytic material, e.g., titanium dioxide or vanadium doped titanium dioxide, to improve the degradation efficiency.

BRIEF DESCRIPTION OF THE DRAWINGS

For the purpose of illustrating the invention, there is shown in the drawings a form, which is presently, preferred; it being understood, however, that this invention is not limited to the precise arrangements and instrumentalities shown.

FIG. 1(a) is a schematic diagram of an ESP system in accordance with the present invention used to measure particle capture efficiency of ESP in the presence of X-ray irradiation;

FIGS. 6(a)–6(c) are exemplary graphical representations of capture efficiency of the collecting electrode of NaCl, $SiO_2$, and $TiO_2$ aerosols, respectively.

FIG. 8 is a schematic diagram of an exemplary system in accordance with the present invention for volatile organic compound (VOC) degradation by soft X-ray irradiated titania in an ESP; and FIGS. 9(a)–(c) show exemplary graphical representations of the degradation efficiency for toluene without $TiO_2$, with pure $TiO_2$, and with V-doped $TiO_2$, respectively.

DETAILED DESCRIPTION OF THE INVENTION

Figure 1B:
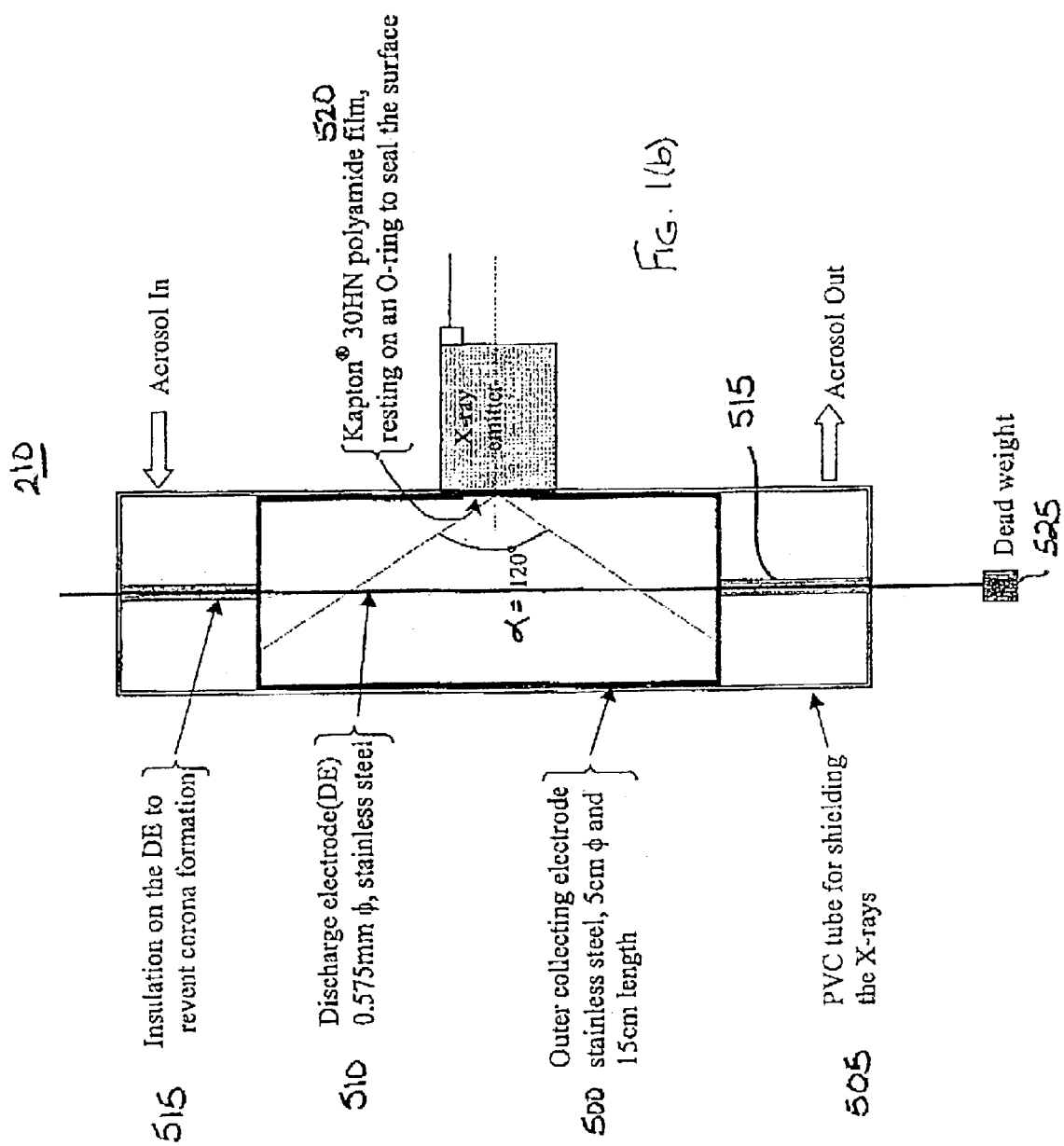
FIG. 1(b) is an exemplary enlarged diagram of the cylindrical ESP with X-ray mount of FIG. 1(a)
Figure 2:
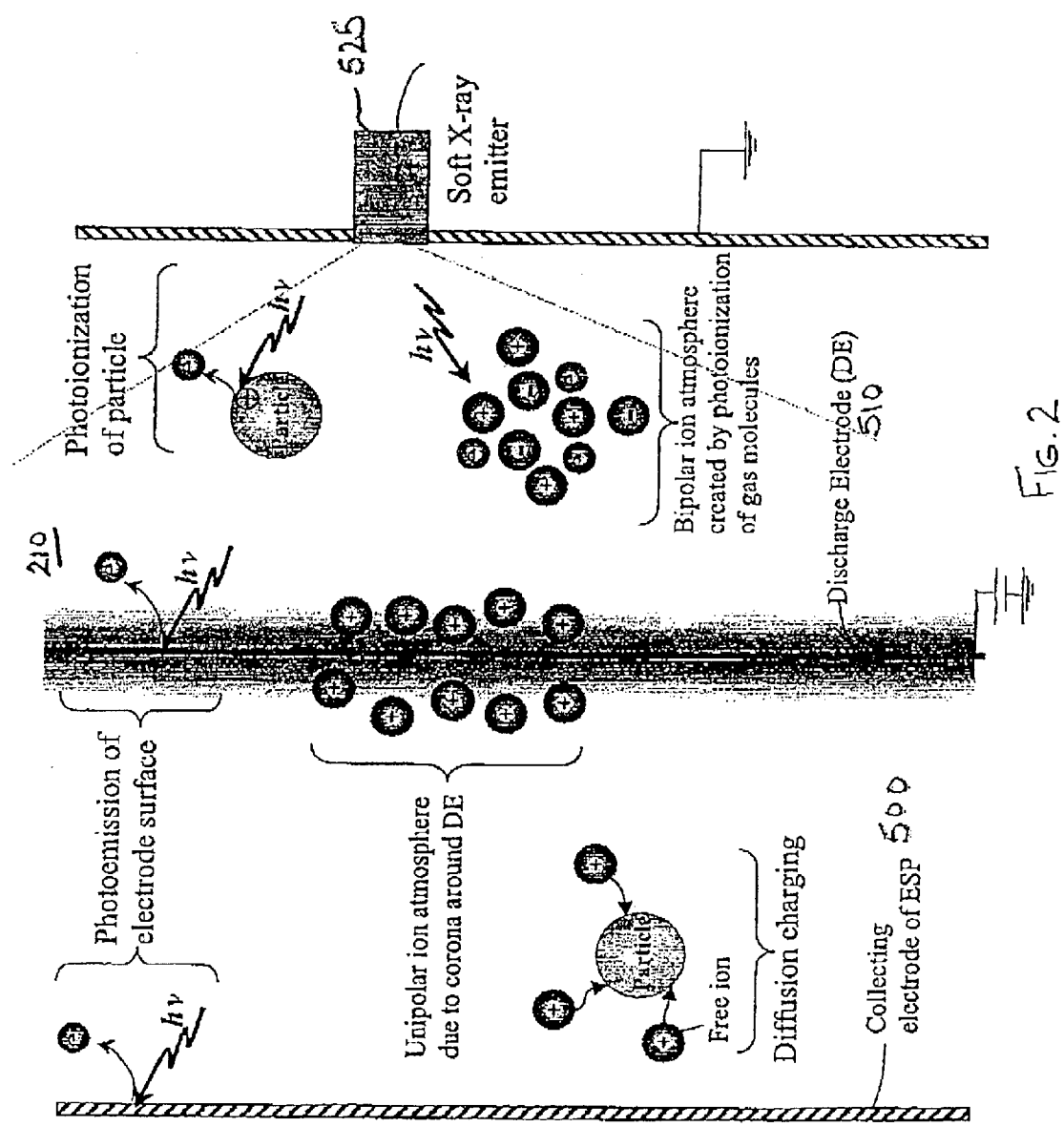
FIG. 2 is an exemplary representation of direct and diffusion photoelectric charging.

FIG. 1(a) is a schematic diagram of an exemplary system 100 to measure particle capture or collection efficiency of an ESP with soft X-ray irradiation in accordance with the present invention. Despite the fact that the particles are shown and described for illustrative purposes only as being exposed to soft X-ray irradiation in FIG. 1(a), it is contemplated and within the scope of the present invention to irradiate the particles using light at any wavelength in the X-ray spectral range. By way of example, the system shown in FIG. 1(a) is arranged for the purification of four aerosols ($Fe_2O_3$, NaCl, $SiO_2$, and $TiO_2$), however, any number of one or more aerosols may be purified. The particles to be purified may, but need not, include any of the four shown in Table 1(a). The exemplary size distribution parameters of the four exemplary aerosol particles tested is shown in Table 1(a).

TABLE 1(a)

Size distribution parameters of aerosols

| Aerosol | Geometric mean diameter (nm) | Geo. Std. Dev. | Total particle number concentration (#/cm³) | Generation method |
| --- | --- | --- | --- | --- |
| $Fe_2O_3$ | 66.58 | 1.86 | $1.3 \times 10^6$ | Furnace reactor |
| NaCl | 86.83 | 1.90 | $2.5 \times 10^6$ | Atomization |
| $SiO_2$ | 77.32 | 1.50 | $1.6 \times 10^7$ | Furnace reactor |
| $TiO_2$ | 64.86 | 1.51 | $5.0 \times 10^6$ | Furnace reactor |

The system 100 includes a particle generation system 101, an ESP 210, and an aerosol size distribution measurement system 301. Particle generation system 101 is adapted, as necessary to purify the particular desired particles. As previously noted, the system 101 shown in FIG. 1(a) is arranged to purify four aerosols ($Fe_2O_3$, NaCl, $SiO_2$, and $TiO_2$), however, any number of one or more aerosols may be purified which may, or may not, include one or more of these four aerosols.

In the exemplary particle generation system 101 of FIG. 1(a), $Fe_2O_3$, SiO2, and $TiO_2$ aerosols are generated using a combustion furnace 160. In particular, $Fe_2O_3$ is produced by atomizing the aqueous suspension of $Fe(NO_3)_3$ in a collision atomizer 155, drying the atomized aerosol in a diffusion dryer 150, and passing the aerosol through the combustion furnace 160. Furnace 160 has an inner core made from a conductive material such as alumina to heat the particles to a temperature preferably between approximately 800° C. and 1000° C. The $Fe_2O_3$ particles output from the combustion furnace 160 are mixed with dilution air and controlled by a series of valves 175, 180.

$SiO_2$, and $TiO_2$ particles are produced from their precursors (Hexa dimethyosiloxane and Titanium tetra isopropoxide (TTIP), respectively). The precursors are entrained in an air-stream saturated by bubbling through the solution at a temperature of 80° C. Thereafter, the saturated precursors are introduced into the combustion furnace 160 where it interacts with oxygen to form the $SiO_2$ and $TiO_2$ aerosols. The generated submicrometer aerosols are then mixed with particle free air to achieve a desired aerosol concentration level and flow rate.

NaCl aerosols are generated by atomizing an aqueous NaCl solution 182 with particle free clean air in a collision atomizer 185. Subsequent thereto the droplets are dried using a diffusion dryer 190.

The $Fe_2O_3$, NaCl, $SiO_2$, and $TiO_2$ aerosols are received by an ESP 210. A detailed enlarged view of the exemplary cylindrical ESP 210 in FIG. 1(a) is shown in FIG. 1(b). Despite the fact that the ESP shown in FIG. 1(b) and described hereinafter is cylindrical, it is contemplated and within the intended scope of the invention to use a different shape reactor, as desired. Outer collecting electrode 500 is made of a conducting material, for example, stainless steel, and is preferably approximately 15 cm in length and approximately 5 cm in diameter. The collecting electrode 500 is encapsulated in a tube 505 made from a material, for example polyvinylchloride (PVC), that significantly reduces or prevents X-ray leakage. A discharge electrode (DE) 510 is also made of a conducting material, preferably stainless steel. Typically, the discharge electrode 510 is a wire supported at the top and a dead (plumb) weight 525 is attached to the bottom to maintain alignment. The collecting and discharge electrodes may be made of the same or different materials. The portion or section of the discharge electrode 510 that extends beyond the collecting electrode 500 is preferably sheathed in an insulating material 515 to prevent or significantly reduce corona formation in that portion or section.

A hole 520 is defined in the collecting electrode 500 through which the discharge electrode 510 is irradiated by a soft X-ray emitter 525 powered by a supply source 220. The soft X-ray radiation is preferably between approximately 3.5 keV and approximately 9.5 keV, at a wavelength preferably between approximately 0.13 nm and approximately 0.41 nm. Once emitted, the soft X-rays are spread at any desired angle $\alpha$ (120 degrees as shown in FIG. 1(b)) and interact with the incoming aerosol particles. A relatively thin film 520, for example, a 30 $\mu$m polyamide film is used to protect the X-ray emitter 525 from the aerosol flow and keep the ESP 210 substantially airtight. The film 520 is selected so that its characteristics allow a relatively high percentage of penetrability of X-rays, preferably 90% or greater. A DC power supply 530 is used to apply a voltage across the collecting and discharge electrodes 500, 510.

A DC mirco ammeter 205 measures the voltage-current characteristics of the ESP 210. The ESP 210 is connected to an aerosol size distribution measurement system 215 that measures the size distribution of the aerosol entering and leaving the ESP 210 using, for example, a Scanning Mobility Particle Sizer (SMPS) or some other electrostatic classifier. A differential mobility analyzer (L-DMA) 225 receives the charged particles output from the SMPS 215. The L-DMA sorts the submicrometer aerosol particles according to size while keeping them suspended in air. Only the positively charged particles are sorted, all the others are lost. A distribution of charges is obtained by measuring the number of concentrations over a range of mobilities. This distribution is then converted using the known relation between mobility and size to determine a size distribution.

The output of the DMA 225 is connected to a condensation particle counter (CPC) 230 to detect and count smaller size particles that could not otherwise be detected by the DMA. Computer 235 receives and processes the data obtained.

In operation, the aerosol particles to be treated are produced and received in that portion of the discharge electrode 510 that extends beyond the collecting electrode 500. The particles to be treated then pass through the discharge electrode and are subjected to the soft X-ray radiation from the emitter 525.

X-ray radiation charge the particles in two ways—(i) direct charging and (ii) diffusion charging. In direct charging the atoms, molecules on the surface of the aerosol particle are photoionized, whereas in diffusion charging the gas molecules are ionized by the radiation and then collide or attach to the particles resulting in the particles becoming electrically charged.

FIG. 2 is an exemplary representation explaining the difference between direct and diffusion particle charging, and the photoemission process inside the ESP in the presence of corona and soft X-ray radiation. The top left portion of FIG. 2 diagrammatically depicts the photoemission process wherein the energy received by the surface of the collecting electrode 500 results in the emission of ions. As represented by the top center of FIG. 2, a similar occurrence may take place about the discharge electrode 510. In the center middle portion of the figure is depicted the unipolar ion atmosphere due to corona around the discharge electrode 510. Direct photoelectric charging is represented in the top right hand side of the figure wherein a particle receives energy and, in turn, discharges an ion. Below that is the representation of the bipolar ion atmosphere created by the photoionization of gas molecules. The lower left hand side of the figure diagrammatically depicts diffusion charging wherein gas molecules are ionized by the soft X-ray radiation and collide with the particles resulting in the particles becoming electrically charged.

Several experiments were performed to confirm enhanced captured efficiency of ultrafine particles by in-situ irradiation of unipolar coronas by soft X-rays. Table 1(b) below is a summary of the experiments conducted.

TABLE 1(b)

Summary of experiments performed

| Set No. | Description | Voltage (kV) | Diameter of DE (mm) | Polarity of DE | Aerosol | Objective |
|---|---|---|---|---|---|---|
| I | V-I characteristics | 0 to 10 | 0.575 and 0.323 | Positive and Negative | $Fe_2O_3$ | Determine the corona inception voltage of the ESP |
| II | Overall capture with and without X-ray | 0 to 10 | 0.575 | Positive | $Fe_2O_3$ | Demonstrate the enhancement in capture efficiency due to X-ray irradiation |
| III | Capture efficiency measurement | 0, 5, 8, 9 and 10 | 0.575 and 0.323 | Positive and Negative | $Fe_2O_3$, NaCl, $SiO_2$, $TiO_2$ | (a) Measure capture efficiencies at varying particle diameter; (b) Measure capture efficiencies at varying voltage levels and study effect of corona; (c) Study the effect of type of corona |

* For all experiments- flow rate: 15 lpm; length of ESP: 15 cm; diameter of collecting electrode: 5 cm.

Current-Voltage Characteristics

A first set of experiments (Set I, Table 1(b)) were performed to determine the corona inception voltage of the ESP and to obtain the corona-current characteristics over the entire range of operating voltages, with and without X-ray radiation. By way of example, experiments were performed with an $Fe_2O_3$ aerosol for two different size diameter discharge electrodes, e.g., 0.575 mm and 0.323 mm, maintained at a positive potential. The applied voltage was varied from 0 kV to 10 kV. The DC micro ammeter was connected between the discharge and collecting electrodes, with and without X-ray radiation. Current-voltage characteristics of other aerosols were also measured.

Figures 3A, 3B:
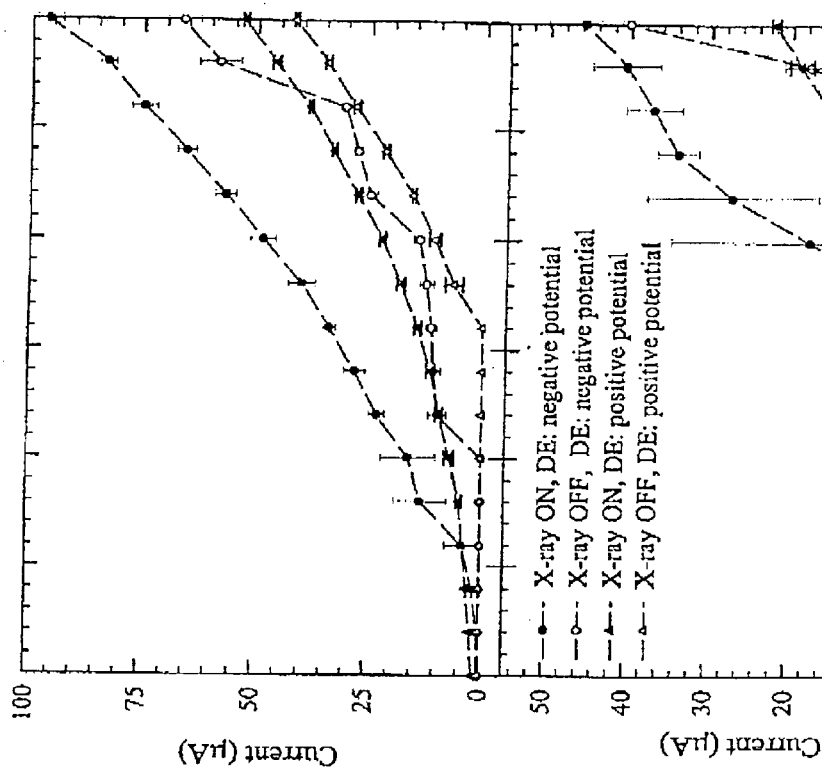
FIG. 3(a) is a graphical representation of current-voltage characteristics for negative/positive potential unipolar corona with the X-ray emitter turned On/Off for a discharge electrode having a 0.575 mm diameter.
FIG. 3(b) is an exemplary graphical representation of current-voltage characteristics for negative/positive potential unipolar corona with the X-ray emitter turned On/Off for a discharge electrode having a 0.323 mm diameter.

FIGS. 3(a) and 3(b) show the experimental voltage-current characteristics of the ESP when purifying $Fe_2O_3$ aerosol particles, with and without X-ray irradiation, for two different diameter discharge electrodes, i.e., 0.575 mm and 0.323 mm, respectively. In the presence of X-ray radiation, the current was significantly higher at a given voltage. For the 0.575 mm diameter discharge electrode, the positive corona inception voltage is approximately 9.0 kV without X-ray radiation and drops down to approximately 8.6 kV in the presence of X-ray radiation. The negative corona inception voltage decreases from approximately 8.9 kV to approximately 7.0 kV when irradiated by X-rays. As is shown by the current voltage graphs in FIGS. 3(a) and 3(b), the current is greater in the case of a negative corona (negative potential applied to the discharge electrode) relative to that of the positive corona (positive potential applied to the discharge electrode) for any given voltage. As expected, the current values are greater for the 0.323 mm diameter discharge electrode compared to that of the 0.575 mm diameter discharge electrode for any given voltage. The variability in corona component is relatively higher for the negative corona compared to that with the positive corona for both diameter discharge electrodes.

Under conventional ESP operation (without X-ray irradiation) positive corona (discharge electrode positive) operation results in excess positive ions in the gas space while that under negative corona results in excess negative ions. However, X-ray irradiation along with unipolar coronas increases the concentration of positive and negative ions (formed by photoionization of gas molecules) and electrons (formed by photoemission of metal electrode surfaces) in the gas space.

X-ray irradiation influences the voltage-current characteristics of the ESP in three ways. First, the current through the ESP system gradually increases with increasing voltage, at voltages significantly below the corona inception voltage, (i.e., the threshold voltage at which a corona is produced) in contrast to the steep increase in the presence of corona only (as shown in FIG. 3). Another advantage effect of the presence of X-ray irradiation is a decrease in corona inception voltage, that is, the voltage at which the current starts increasing at a faster rate. Yet another advantage of exposing the particles in the ESP to X-ray irradiation is that, for any given voltage, the absolute current values are significantly higher in the presence of X-ray radiation, than without.

Increasing the voltage applied to the electrodes results in greater separation of bipolar ions and electrons generated by the photionization of the gas molecules. As a result, the current increases with increasing voltage, in the absence of corona. The presence of higher concentrations of ions and electrons in the gas space due to the presence of X-ray photoionization, before corona initiation, significantly alters the dielectric behavior of the air. Due to the higher ion concentration levels the air has a lower conductivity, leading to electron avalanche initiation at significantly lower voltages. In addition, the increased concentrations of ions and electrons in the presence of X-ray irradiation produces a higher current in the ESP system at any given voltage.

In the presence of X-ray irradiation, the negative corona (negative voltage applied to the discharge electrode) results in a higher current relative to that of the positive corona (positive voltage applied to the discharge electrode) at the same applied voltage, i.e., $(I_{total})_{negative} > (I_{total})_{positive}$. As previously mentioned, X-ray irradiation produces bipolar ions in contrast to unipolar ions generated by the corona. When a negative voltage is applied to the discharge electrode in the presence of a corona and X-ray radiation, a larger fraction of negative ions and electrons are generated. Due to the higher mobility of negative ions and electrons, a higher current is observed. The current values were used to estimate the ion concentrations listed in Table 2 below. The bipolar ion concentration generated by X-ray radiation was determined by measuring the saturation ion current in an ion chamber.

TABLE 2

Estimated concentrations of positive and negative ions calculated using the measured corona current and ionic mobility

| | Unipolar positive Corona* | Positive corona With X-ray* | Unipolar negative corona* | Negative corona with X-ray* (negative ions) | Negative corona with X-ray* (free electrons) | Only X-ray¥ |
|---|---|---|---|---|---|---|
| Ion concentration (#/m³) | $5 \times 10^{12}$ | $1.46 \times 10^{14}$ | $3.7 \times 10^{12}$ | $3.03 \times 10^{14}$ | $8.6 \times 10^{11}$ | $1 \times 10^{14}$ |

*$N_i = I_c/(e.Z_{ion}.E.S)$ (Kirsch and Zagnit'ko, 1981); $I_c$ = ion current, e = unit electron charge ($1.6 \times 10^{-19}$ C), $Z_{ion}$ = Mobility of ion (positive ions: $1.4 \times 10^{-4}$, negative ions: $1.9 \times 10^{-4}$, free electrons: $6.7 \times 10^{-2}$ $m^2 V^{-1} s^{-1}$), E = Local electrical field ($8.06 \times 10^4$ $V.m^{-1}$ at 9 kV), S = surface area of electrodes ($2.36 \times 10^{-2}$ $m^2$);
¥$N_i = [I_s/(\alpha.\ e.\ V)]^{1/2}$ (Adachi et al., 1985); $I_s$ = saturation current (0.15 μA), α = recombination coefficient ($10^{-12}$); V = volume of ionization chamber ($7.24 \times 10^{-5}$ $m^3$);

Average Charge per Particle

Referring once again to Table 1(b), a second set of experiments (Set II) were conducted to demonstrate the overall effect soft X-ray irradiation has on the capture of particles and the effectiveness of soft X-ray photoionization on outlet particle concentration of the ESP. The average charge per particle escaping the collection rapidly increases in the presence of X-ray irradiation and corona. The total particle concentration at the outlet of the ESP was monitored over time under a predetermined sequence of operating conditions, involving switching the X-ray radiation and electrode potentials ON and OFF in different sequences. The average charge (total charge/total particle concentration) of the aerosol escaping collection was also simultaneously measured. An electrometer (shown as part of the high voltage power source 530 in FIG. 1(*a*)) operating in parallel to the CPC was used to obtain the average charge data.

Figure 4:
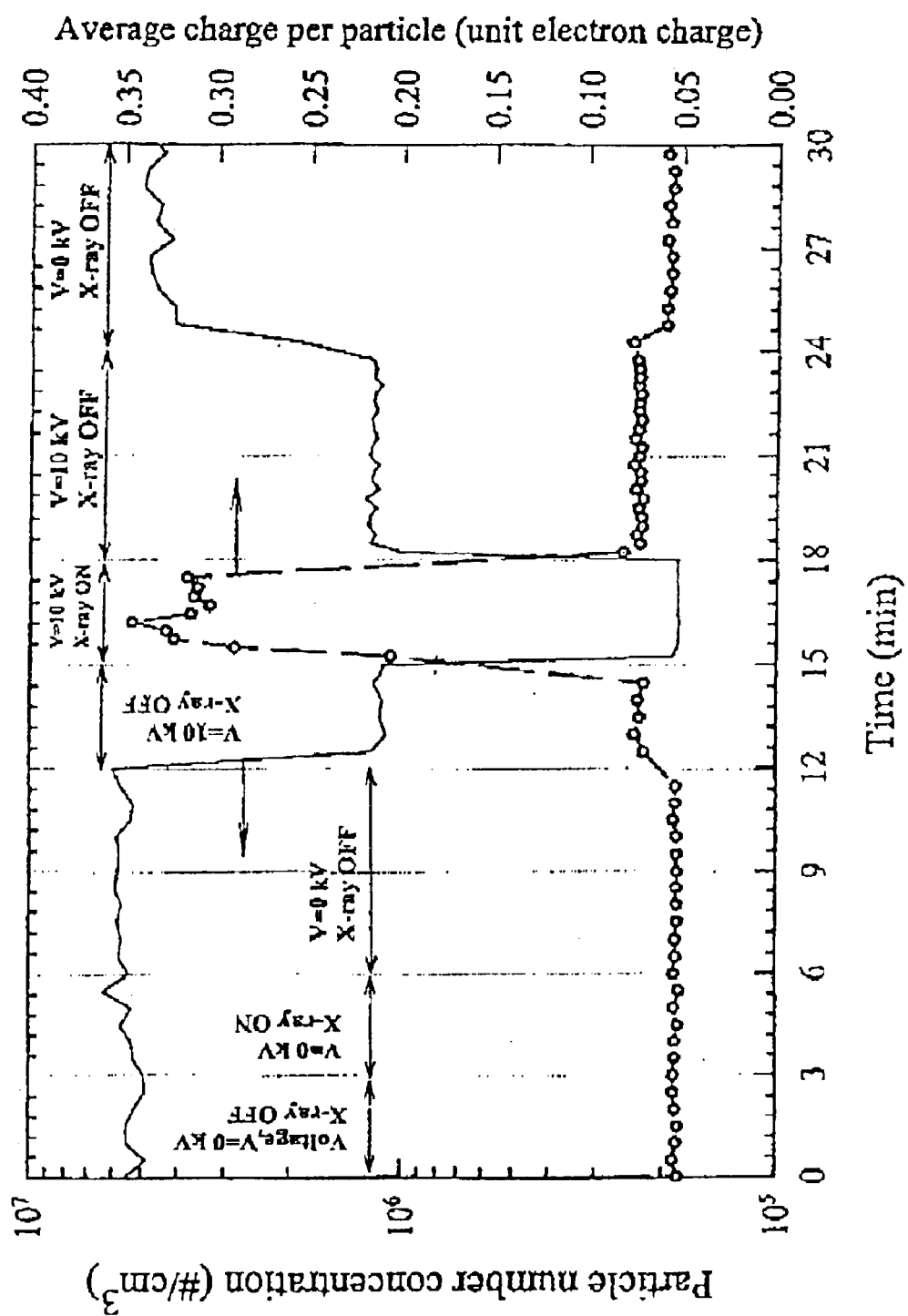
FIG. 4 is an exemplary graphical representation for $Fe_2O_3$ aerosol under different operating conditions of time versus variation in particle number concentration at the outlet of the ESP (left axis) and average charge per particle (right axis)

FIG. 4 is an exemplary graphical representation of variation in particle concentration at the outlet of the ESP (represented by a solid line, referring to the left axis) and average charge per particle escaping the ESP (denoted by open circles, referring to the right axis) varying over time for $Fe_2O_3$ aerosol particles. At time t=0, the particle concentration at the inlet of the ESP is approximately $5 \times 10^6$ #/cm$^3$. At time t=3 min, the X-ray device was turned ON, e.g., no voltage is applied across the discharge and collecting electrodes, and a very slight increase in the number of particles at the ESP outlet. This increase is due to the particles entering the ESP carrying some charge even after passing through the neutralizer 200 (e.g., Kr-85 bipolar charger)(FIG. 1(*a*)). X-ray photoionization further neutralizes the charge on the particle, resulting in lower losses to the ESP walls and a corresponding increase in the number of particles at the outlet of the ESP. X-ray irradiation was turned OFF at time t=6 min, and the number of particles slowly returned to the initial inlet concentration level. There was a slight time lag between the time the X-ray was turned OFF and the time when the concentration returned to its initial inlet concentration level. This relaxation effect was probably attributable to the still active collecting and discharge electrode surfaces of the ESP, which are in an excited state due to X-ray absorption.

At time t=12 min, a potential difference of 10 kV was applied across the electrodes, while the X-ray irradiation remained OFF. This operation corresponded to a conventional single stage ESP operation (without the presence of X-ray irradiation) in which charging takes place due to the corona around the discharge electrode and particles are captured on the outer collecting electrode. The number of particles at this time was approximately $10^6$ #/cm$^3$. At time t=15 min, the X-ray radiation was turned ON, with the applied voltage maintained at 10 kV. In this case, ionization took place in the corona region around the discharge electrode as well as due to X-ray photoionization. The number of particles rapidly dropped to $2 \times 10^6$ #/cm$^3$. When the X-ray was turned OFF at time t=18 min, the number of particles returned to the initial value prior to turning ON the X-ray (t=12 mins–15 mins). At a later point in time t=24 mins, the applied voltage across the electrodes was reduced to 0 kV and the number of particles again returned to its initial inlet count at time t=0.

Still referring to FIG. 4, the open circles referring to the right axis represent the variation of average net charge per particle. The average charge per particle is determined based on the electrometer current (I), flow rate (Q) and total number concentration (N) using the equation:

$$q_{avg} = \frac{I}{N \cdot Q \cdot e}$$

where, $q_{avg}$ is the average charge per particle (in unit electron charge units); and e is the unit electron charge.

The average charge measured represents the aerosol escaping collection in the ESP, and hence only provides qualitative information. The particles entering the ESP at time t=0 carried a relatively small average charge. When the X-ray was turned ON at time t=3 min, the average charge on the particles coming out of the ESP decreased by an insignificant amount, indicating that some further neutralization took place due to X-ray bipolar charging. A potential difference of 10 kV was applied across the electrodes at time t=12 min, corresponding to a decrease in number of particles, the average charge on the particle leaving the ESP increased by a factor of 1.5. The X-ray was again turned ON at time t=15 min, causing the charge on the particles leaving the ESP to increase by a factor of approximately 4.3, clearly indicating the increased charging efficiency of particles due to X-ray photoionization.

The net average charge per particle due to X-ray irradiation decreases in the absence of corona (i.e., 0 kV applied voltage across the electrodes) and increases in the presence of corona (e.g., 10 kV applied voltage across the electrodes). The average charge decreased by 14% for the $Fe_2O_3$ aerosol in the absence of corona, whereas it increased by a factor of 6.5 (550%) in the presence of corona (10 kV). Hence, X-ray radiation in the presence of unipolar corona improves charging efficiency.

As previously described above, there are two mechanisms by which a particle can acquire charge—(i) direct charging due to photoionization and (ii) diffusion charging. While the former mechanism depends on the intensity and wavelength of the incident radiation, composition of aerosols, the latter depends on the extent of ion atmosphere and the mobility of the ions. Applying a relatively high voltage across the electrodes affects the conditions only with respect to diffusion charging. The external applied voltage aids in better separation of bipolar ions promoting the extent of unipolar ion atmosphere (owing to different electrical mobility of ions). Increasing the voltage in the presence of X-ray radiation may also significantly change the photoelectric behavior of metal electrode surfaces, especially near the corona inception voltage or photoelectric threshold potential of the metal electrode surface. The presence of corona further enhances the unipolar ion atmosphere thereby improving the efficiency of diffusion charging.

Enhanced Capture Efficiency

Figure 5A:
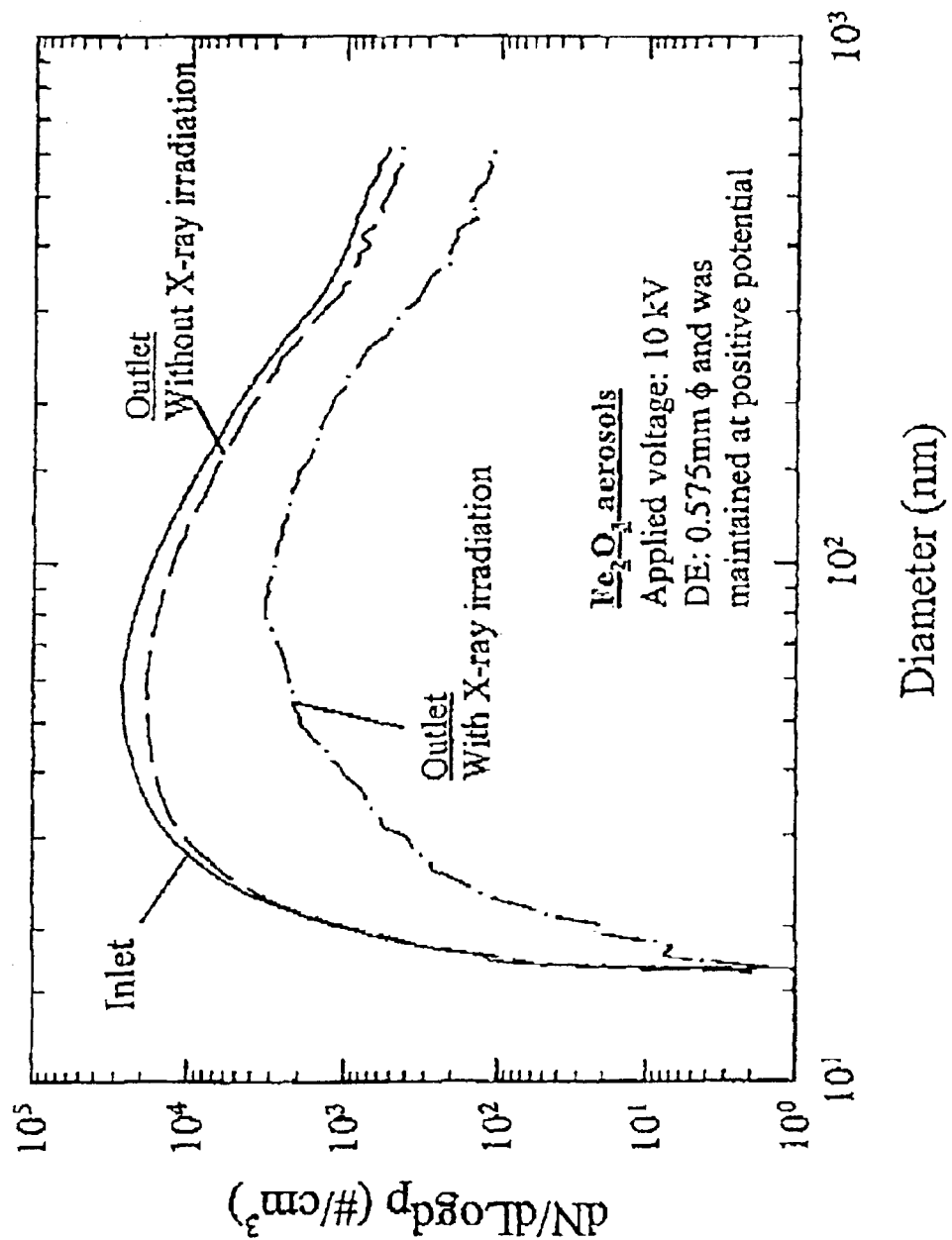
FIG. 5(a) is an exemplary graphical representation of size distribution of $Fe_2O_3$ aerosol at the inlet and outlet of the ESP with and without X-ray irradiation.
Figure 5B:
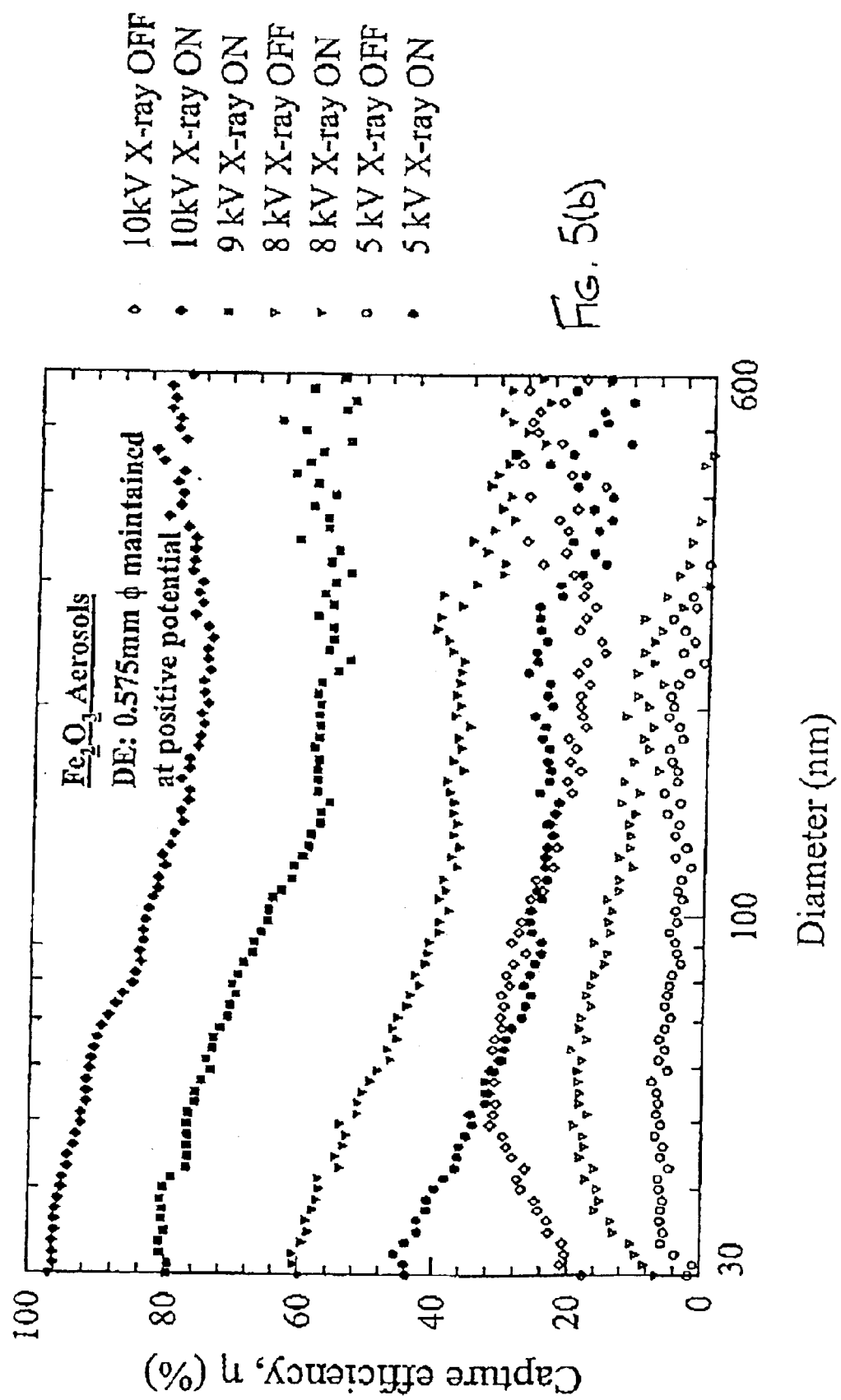
FIG. 5(b) is an exemplary graphical representation for $Fe_2O_3$ aerosol of capture efficiency of the collecting electrode as a function of diameter both with and without the presence of X-ray irradiation.

The last experiment (Set III, Table 1(b)) show the enhancement of capture efficiencies due to X-ray irradiation under different operating conditions, i.e., varying voltage levels and the polarity of the discharge electrode. By way of example, capture efficiencies for the $Fe_2O_3$ aerosol were measured. FIG. 5(*a*) shows a typical size distribution of $Fe_2O_3$ aerosol at the inlet and outlet of the ESP obtained using the SMPS system. The aerosols studied were polydisperse with a distribution between 20 nm and 600 nm. As is clearly shown in FIG. 5(*a*), X-ray irradiation reduces the concentration at the outlet of the ESP by an order of magnitude.

FIG. 5(*b*) is a graphical representation of the capture efficiency (η) as a function of diameter for the $Fe_2O_3$ aerosol at four different applied voltage levels. A 0.575 mm diameter discharge electrode at positive potential was used in the experiment. The capture efficiency curves without X-ray irradiation (denoted by open circles) show a decreasing capture as the size decreases below 60 nm. For example, the efficiency at 10 kV applied voltage (without X-ray, as denoted by open diamonds) continually decreased with decreasing diameter below approximately 60 nm. Specifically, the efficiency was approximately 31% at 50 nm, approximately 23% at 35 nm, and approximately 11% at 20 nm (not shown in FIG. 5(*b*)). Lower efficiencies have been mainly attributed to poor diffusion charging of ultrafine particles due to their low saturation charge and lower ion attachment coefficients.

The efficiencies of capture with X-ray radiation are represented by solid symbols in FIG. 5(*b*). At any given voltage, the efficiency of capture with X-ray radiation is significantly higher compared to that without X-ray irradiation for all the particle diameters. The increase in efficiency due to X-ray relative to that without X-ray irradiation is highest for smaller particles and relatively lower for larger particles. For instance, at 10 kV, efficiencies due to X-ray irradiation increased by a factor of 10 for 20 nm particles, by a factor of 3 for 50 nm, and by a factor of 3.2 for 100 nm particles. Accordingly, X-ray radiation is effective in charging of ultrafine particles, particularly in the size ranges below approximately 50 nm where charging by a unipolar corona is inefficient. Capture efficiencies at approximately 10 kV with X-ray irradiation decreases with increasing diameter and roughly plateau after approximately 200 nm.

TABLE 3(a)

Capture efficiencies (%) for a 40 nm diameter particle with (and without) X-ray irradiation at different voltage levels with positive polarity discharge electrode (DE) (0.575 mm φ)

| Voltage (kV) | $Fe_2O_3$ | NaCl | $SiO_2$ | $TiO_2$ |
| --- | --- | --- | --- | --- |
| 5 | 50.8 (17.9)¥ | 47.7 (36.4) | 48.5 (12.3) | 57.6 (9.81) |
| 8 | 59.1 (23.4) | 78.3 (42.1) | 74.9 (14.8) | 85.8 (13.3) |
| 9 | 80.4 (26.7) | 93.1 (42.3) | 95.3 (16.8) | 97.4 (18.4) |
| 10 | 86.4 (29.2) | 96.4 (43.2) | 99.0 (16.0) | 99.5 (98.6) |

¥Values in the parenthesis indicate capture efficiencies without X-ray irradiation, keeping all other operating conditions the same.

TABLE 3(b)

Capture efficiencies (%) for a 40 nm diameter particle with (and without) X-ray irradiation at different voltage levels with positive polarity discharge electrode (DE) (0.323 mm φ)

| Voltage (kV) | $Fe_2O_3$ | NaCl | $SiO_2$ | $TiO_2$ |
| --- | --- | --- | --- | --- |
| 5 | 55.8 (19.8) | 48.2 (38.9) | 35.1 (11.9) | 71.2 (20.4) |
| 8 | 95.6 (24.8) | 96.7 (45.4) | 92.1 (14.1) | 98.2 (23.6) |
| 9 | 99.1 (99.1) | 99.2 (99.4) | 99.3 (92.1) | 99.8 (99.7) |
| 10 | 99.9 (99.9) | 99.7 (99.8) | 99.6 (99.8) | 99.9 (99.9) |

¥Values in the parenthesis indicate capture efficiencies without X-ray irradiation, keeping all other operating conditions the same.

Tables 3(a) and 3(b) above summarize the capture efficiencies of a 40 nm particle at varying voltage levels for $Fe_2O_3$, NaCl, $SiO_2$, and $TiO_2$ aerosols using different discharge electrodes having diameters of 0.575 mm and 0.323 mm, respectively. Capture efficiencies without X-ray irradiation are provided between parenthesis. Comparing efficiencies of 40 nm $Fe_2O_3$ particles using a discharge electrode having a 0.575 mm diameter at different voltage levels shows that efficiency due to X-ray irradiation increased from approximately 51% at 5 kV, 59% at 8 kV, 81% at 9 kV, and 86% at 10 kV. In contrast, under conventional ESP operation, that is, without the presence of X-ray irradiation, the efficiency only increased from approximately 18% at 5 kV to approximately 29% at 10 kV. At lower voltages, i.e. between approximately 5 kV and 8 kV when there is no corona, the efficiencies in the presence of X-ray radiation though higher in magnitude, follow a bell shaped curve, indicating lower charging efficiency of smaller particles (less than approximately 60 nm). Whereas, with higher voltages the bell shaped curve disappears and enhanced charging efficiency below 60 nm. This clearly shows the effectiveness of the X-ray irradiation in charging the particles enhanced by the presence of corona.

Figure 6A:
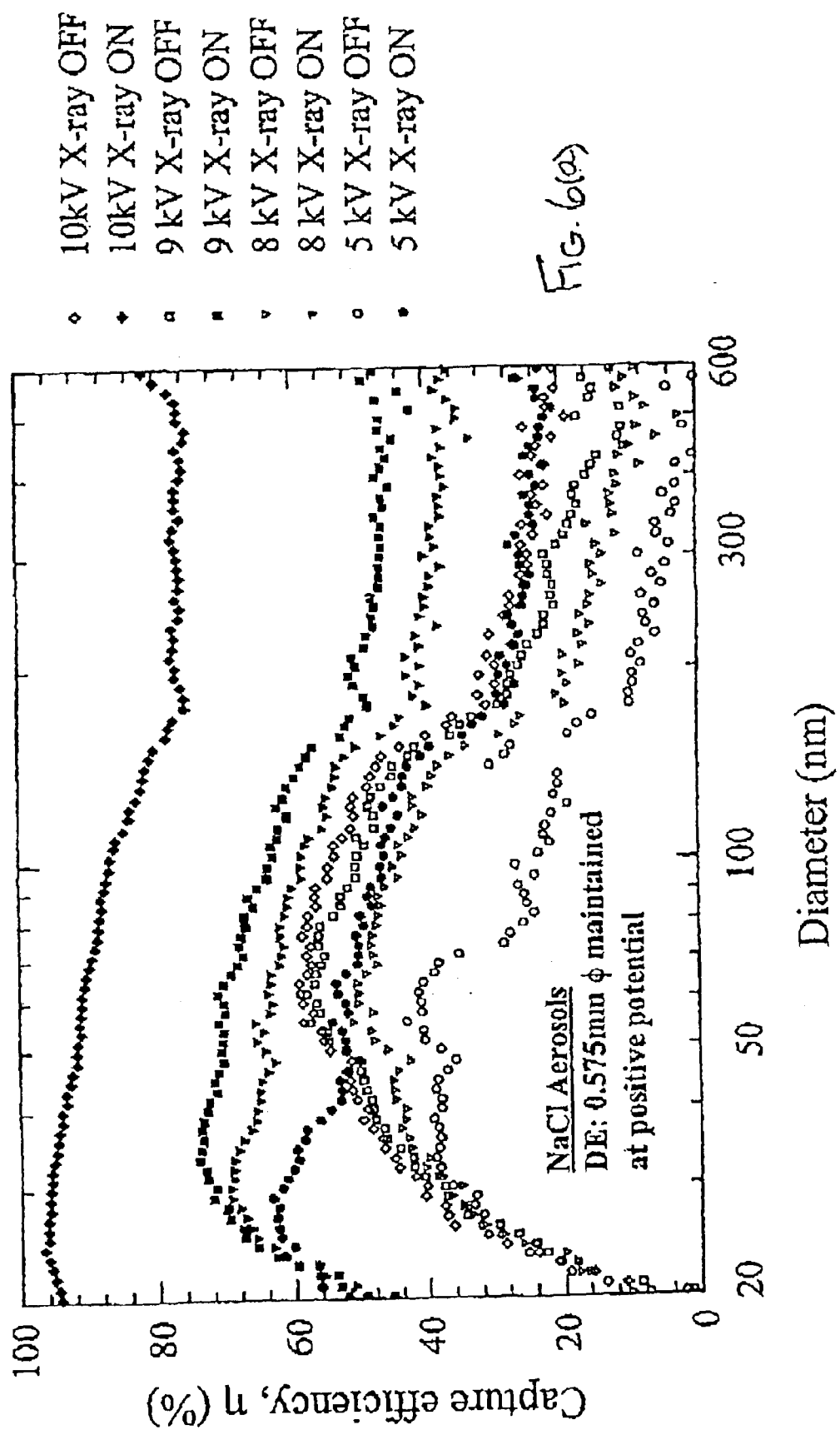
Figure 6B:
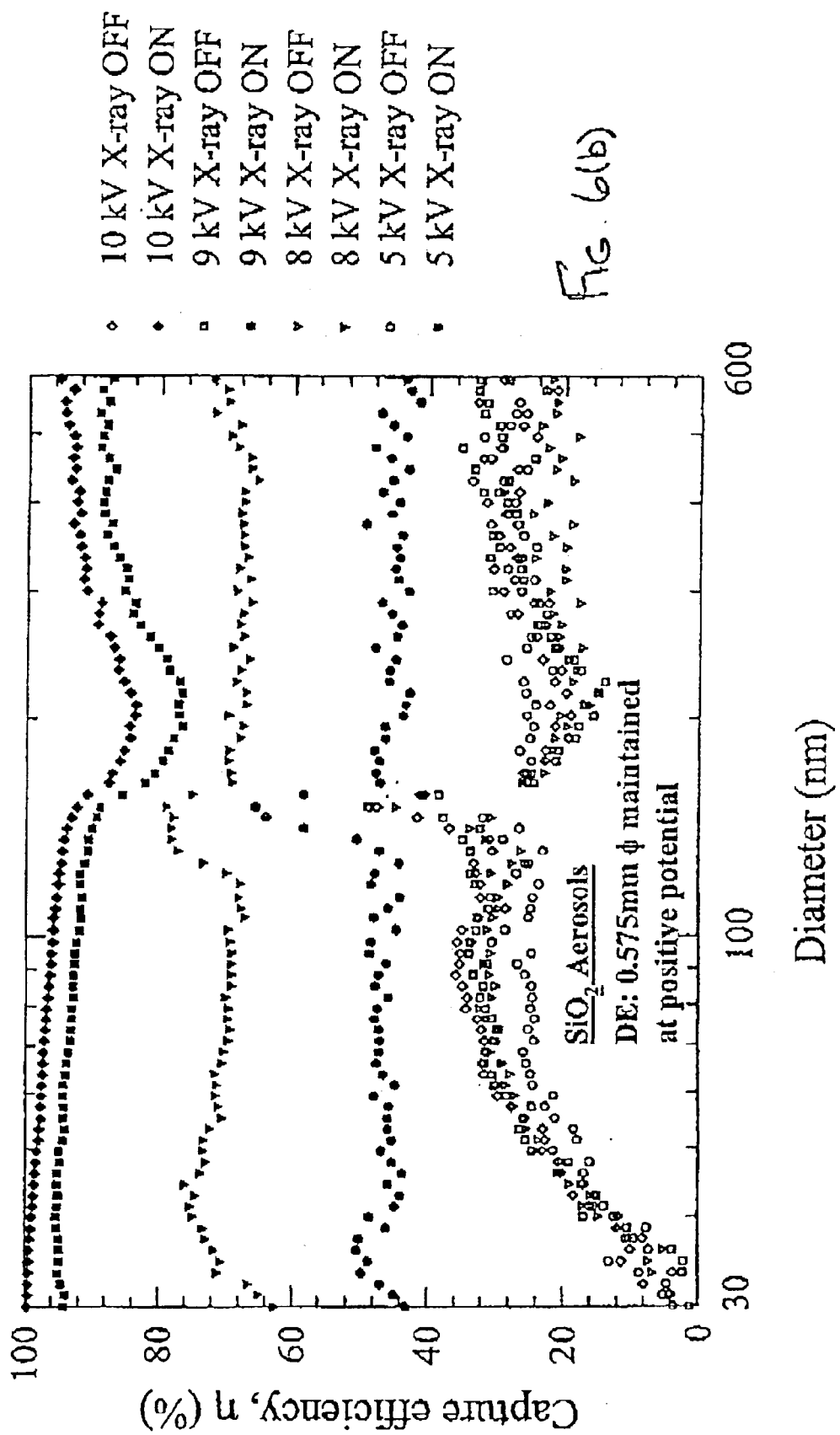

Experiments were also conducted and capture efficiencies measured for other aerosols, viz. NaCl, $SiO_2$, and $TiO_2$, the representative capture efficiency measurements of which are provided in FIGS. 6a, 6b and 6c, respectively. These aerosols exhibit a similar qualitative trend—charging due to X-ray is very efficient in the ultrafine fraction and presence of corona rapidly increases charging efficiency. A pronounced effect of applied voltage is also seen in all cases. Comparing efficiencies of the different aerosol particles tested, efficiencies are normally higher for $TiO_2$ aerosol relative to the other aerosols tested. The charging efficiency of the particle depends on various factors such as their physical characteristics (which affects the direct photoionization and diffusion charging efficiency), chemical composition (which affects direct photoionization and the photoionization threshold could be different for each material) and the number concentration of the aerosol in the gas space (affects the scattering of the X-ray radiation and hence direct photoionization and photoemission from the surface of the metal electrodes).

Table 3(a) provides capture efficiencies of the four aerosols tested, with and without X-ray irradiation, for a discharge electrode having a diameter of 0.323 mm. A comparison of the capture efficiencies for the 0.323 mm diameter discharge electrode with those of the 0.575 mm diameter discharge electrode (Table 3(b)) indicate that higher efficiencies are obtained with the former smaller diameter. Reducing the diameter of the discharge electrode decreases the corona inception voltage. Hence the extent of corona is higher at any given voltage (above inception voltage) resulting in higher capture efficiency with a smaller diameter discharge electrode. In addition, less enhancement in capture efficiency is obtained when using a discharge electrode having a 0.323 mm diameter compared to a 0.575 mm diameter at higher applied voltages in the presence of X-ray irradiation due to higher ion concentration in the latter case.

Figure 7:
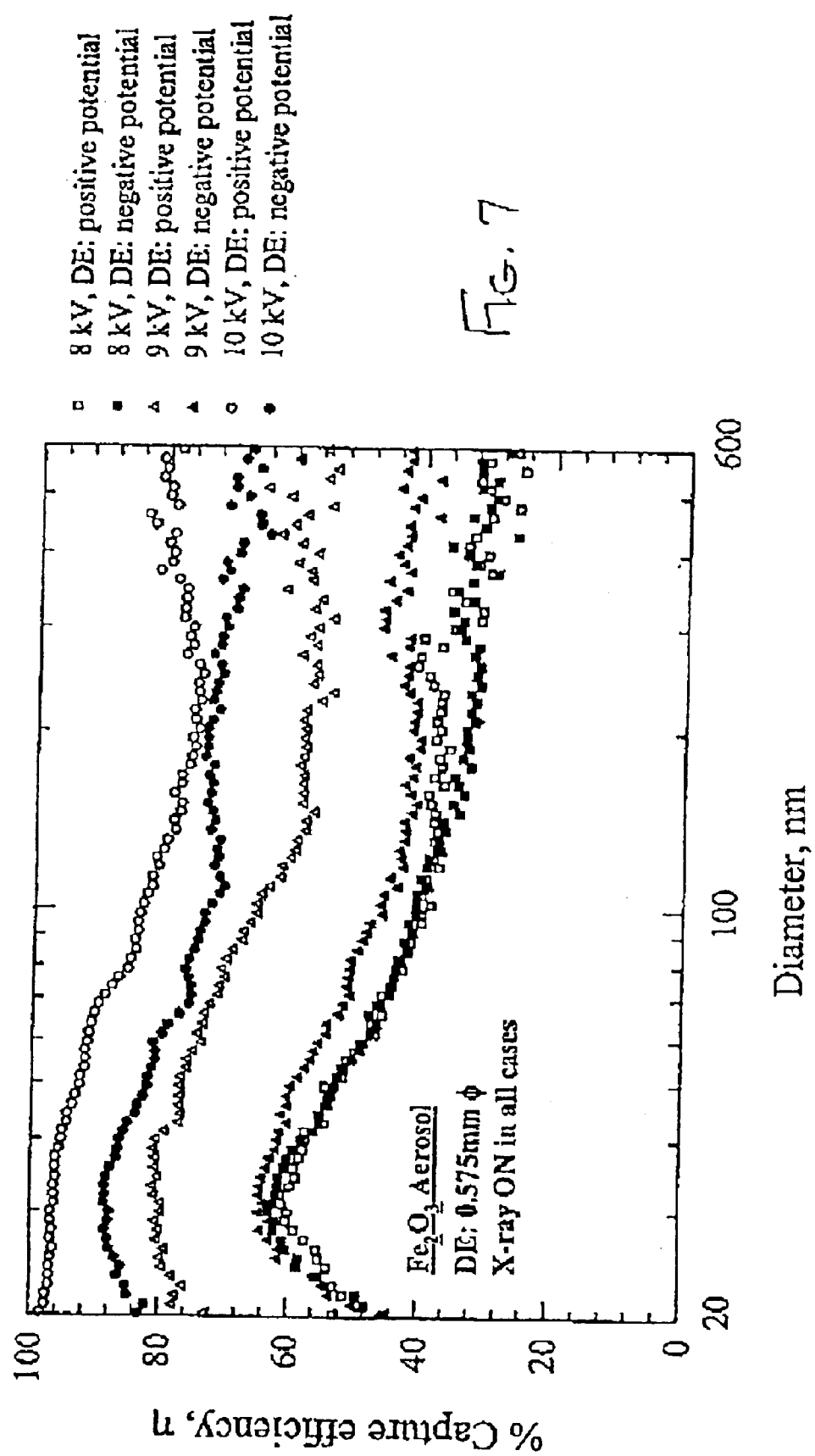
FIG. 7 is an exemplary graphical representation of capture efficiency of the collecting electrode for $Fe_2O_3$ aerosol comparing positive and negative discharge corona.

Capture efficiencies differ depending on the particle material and the type of corona. FIG. 7 compares capture efficiency curves for $Fe_2O_3$ particles with positive and negative coronas (with X-ray irradiation) at three voltage levels using a 0.575 mm diameter discharge electrode. It is clear from FIG. 7 that capture efficiencies with X-ray irradiation in a positive corona are higher compared to those in a negative corona. At 8 kV the corona is not fully developed and hence there is no significant difference in capture efficiency between the positive and negative corona.

TABLE 4

Comparison of capture efficiencies with negative and positive corona at two different particle diameters

| | $D_p$ = 40 nm | | $D_p$ = 100 nm | |
| --- | --- | --- | --- | --- |
| | Positive corona | Negative corona | Positive corona | Negative corona |
| $Fe_2O_3$ | 80.4 (26.7)¥ | 61.4 (26.4) | 65.1 (24.2) | 46.0 (40.6) |
| NaCl | 93.1 (42.3) | 72.9 (48.4) | 74.5 (29.9) | 50.3 (58.8) |
| $SiO_2$ | 95.3 (16.8) | 74.0 (17.7) | 90.2 (15.4) | 70.1 (23.1) |
| $TiO_2$ | 97.4 (18.4) | 78.7 (19.4) | 99.1 (18.8) | 78.9 (35.5) |

¥Values in the parenthesis indicate capture efficiencies without X-ray irradiation, keeping all other operating conditions the same.

Table 4 above compares capture efficiencies of 40 nm and 100 nm particles of the four aerosols being tested for positive and negative corona. Collection efficiencies of $Fe_2O_3$ under conventional ESP operation (without X-ray irradiation) are slightly higher for negative corona relative to that of positive corona. In the presence of X-ray irradiation, a reverse trend is observed. Capture efficiency in the presence of X-ray irradiation is approximately 80% and approximately 61% for positive and negative corona, respectively.

For the four aerosol particles tested, the capture efficiencies with a positive corona were higher by a factor between approximately 1.3 and 1.5.

For a positive corona only operation without X-ray irradiation, excess positive ions are present in the gas space while for a negative corona without X-ray irradiation excess negative ions are present. Thus particles acquire positive charge in a positive corona and negative charge in a negative corona. Since negative ions have higher electrical mobility, negative corona yield higher diffusion charging efficiencies relative to that of positive corona. Accordingly, higher capture efficiencies are obtained with a negative corona without the presence of X-ray irradiation.

In contrast, when X-ray irradiation is present along with the unipolar corona, the charging process is augmented by (i) direct photoionization of the particle (ii) enhanced unipolar atmosphere created by separation of bipolar ion atmosphere generated by X-ray radiation due to the applied electrical field, and (iii) enhanced ion and electron concentration in the gas space due to photoionization of the metal electrode surfaces. Of these three factors, the extent of unipolar atmosphere enhanced by separation in the applied electrical field depends on the polarity of the electrodes and positioning of collecting electrodes with respect to the X-ray radiation source. In the case of negative corona, due to the higher mobility of negative ions and electrons, especially near the collecting electrodes owing to particular positioning of X-ray in the ESP, are rapidly removed from the gas space leaving behind a lesser concentration of ions, leading to a lower diffusion charging efficiency. The life time (residence time) of ions in the positive corona in the presence of X-ray radiation is greater resulting in more efficient diffusion charging.

V-I characteristics represented in FIG. 3 show that $(I_{total})_{negative} > (I_{total})_{positive}$. The total current is composed of two components—one due to flow of particles to the electrodes and the other due to flow of ions and electrons. Thus, the total current may be represented by the equation $I_{total} = I_{particle} + I_{ion}$. The higher capture efficiencies associated with positive corona implies that $(I_{particle})_{positive} > (I_{particle})_{negative}$. Since the relationship $(I_{total})_{negative} > (I_{total})_{positive}$ must be satisfied, $(I_{ion})_{negative} > (I_{ion})_{positive}$. This means that more free ions or electrons are reaching the electrodes when the discharge electrode is at negative potential instead of charging the particles. This results in a lower diffusion charging efficiency and less capture efficiency with negative corona compared to positive corona.

The photoemission from the metal surface of the collecting electrode occurs in three stages or steps—(i) excitation of an electron by absorption of radiation, (ii) escape of photoexcited electron from the surface barrier potential, and (iii) escape of an electron from the coulomb and image potential. In the case of a positive corona, the applied electrical field reduces the net photo threshold potential of the collecting electrode surface by reducing the coulomb potential component. This results in a higher yield of electrons/ions in the gas space and thus higher capture efficiencies. The net photoionization yield of gas molecules could also be significantly different under reverse polarity of electrodes, resulting in different ion concentrations with positive and negative corona.

Calculations were carried out to determine the charging of particles using Fuchs equation for particle-ion attachment, as found in the publication he authored entitled, *"On the Stationery Charge Distribution on Aerosol Particles in a Bipolar Ionic Atmosphere"*, Geofis. Pura Appl., Vol. 56, p. 185 (1963). The results of these calculations are summarized in Table 5.

TABLE 5

Theoretically computed relative fractions of 40 nm uncharged particles under different conditions

| | Ion concentration, #/m³ | | Relative* |
|---|---|---|---|
| | $N_i^+$ | $N_i^-$ | fraction |
| Unipolar positive corona | $5 \times 10^{12}$ | — | 42.5 |
| Unipolar negative corona | — | $3.7 \times 10^{12}$ | 20.0 |
| Pure bipolar | $1 \times 10^{14}$ | $1 \times 10^{14}$ | 2.3 |
| Bipolar plus negative corona | $1 \times 10^{14}$ | $1.3 \times 10^{14}$ | 1.8 |
| Bipolar plus positive corona | $1.46 \times 10^{14}$ | $1 \times 10^{14}$ | 1.0 (0.04%) |

*Relative to fraction of uncharged particles remaining after 0.05 sec for the bipolar + positive corona case The calculations were first done for a case of unipolar ions, as would be expected in case of only a corona being present. Using the ion concentrations listed in Table 2, the negative corona is more efficient at charging particles (see relative fractions in Table 4), and this is consistent with the capture efficiency measurements. Irradiating with X-ray only results in bipolar ions and the calculated fraction of uncharged particles is lower than that of the unipolar corona, and hence capture efficiency of such particles should be higher. The results in FIGS. 5(*b*) and 6 support these calculations, wherein higher efficiencies were observed in the case of X-ray irradiation only (in the absence of corona) relative to that with a unipolar corona at 9 kV. Calculations were also determined for a case when there are bipolar ions present in addition to the unipolar ions generated by corona. For the positive corona case, the fraction uncharged is the lowest, consistent with the highest measured efficiencies (FIG. 7, Table 4). In the case of negative corona with X-ray irradiation, it is difficult to get an accurate estimate of the concentration of negative ions and electrons. The X-ray irradiated positive corona is more effective at removing particles compared to X-ray irradiated negative corona (FIG. 7, Table 4). Thus, the fraction of uncharged particles in the negative corona case should be greater. This is true for ion concentrations less than approximately $1.3 \times 10^{14}$ m$^{-3}$. This value is in between the estimated concentrations of negative ions and electrons (based on V-I measurements) reported in Table 2.

The experimental results conducted for the four aerosol particles establish that a combination of X-ray irradiation with the corona discharge generated by an applied electrical field results in enhanced ion concentrations and effective charging of ultrafine particles. X-ray irradiation incident on electrode surfaces and the gas space results in lowering of inception voltage for initialization of the corona. Furthermore, the presence of electrical field results in ion separation that increase their lifetime and hence more effectively charges the particles. A positive corona in the presence of X-ray irradiation results in the highest charging efficiencies, followed by a negative corona with X-ray radiation, X-ray radiation only (in the absence of corona), negative corona only (without X-ray irradiation), and finally positive corona only (without X-ray irradiation).

There is no limit to the type of particles which may be captured using the method and system in accordance with the present invention. Of particular recent importance is the capture and inactivation of bioaerosol particles. The present inventive method and system is particularly well suited for use with bioaerosol particles in that the X-ray radiation and corona discharge capture the particles and due to their organic composition simultaneously inactivate the toxic bioagents therein using a single device. By way of illustrative example, FIG. 8 is a schematic diagram of an exemplary system in accordance with the present invention for volatile organic compound (VOC) degradation by soft X-ray irradiated titania in an ESP. The interior walls are preferably coated with a photocatalytic material such as a nanostructured layer of titanium dioxide or transition metal doped titanium dioxide (e.g., vanadium doped titanium dioxide), to improve the degradation efficiency. FIGS. 9(a)–(c) show exemplary graphical representations comparing degradation efficiency data for toluene using the system in FIG. 8 without the layer of $TiO_2$, with a layer of pure $TiO_2$, and with a layer of V-doped $TiO_2$, respectively. These experimental results establish that corona and x-ray irradiation can substantially degrade or oxidize organic species, that is, captured bioaerosols and/or organic particles and gases.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims. All of the publications referred to herein are each hereby incorporated by reference in their entirety.

What is claimed is:

1. A method for enhanced charging of aerosol particles a corona discharge generated in an electrostatic precipitator having a discharge electrode and a collecting electrode, comprising the steps of:

receiving the aerosol particles in the electrostatic precipitator; applying a voltage between the electrodes of the electrostatic precipitator to generate the corona discharge; and simultaneously irradiating the aerosol particles in situ of the electrostatic precipitator with X-rays generated by an X-ray emitter.

2. The method in accordance with claim 1, wherein the corona discharge is one of a unipolar corona discharge and a bipolar corona discharge.

3. The method in accordance with claim 2, wherein the corona discharge is a negative unipolar corona discharge.

4. The method in accordance with claim 2, wherein the corona discharge is a positive unipolar corona discharge.

5. The method in accordance with claim 1, wherein the X-rays have an applied voltage between approximately 3.5 keV and approximately 9.5 keV.

6. The method in accordance with claim 5, wherein the X-rays are soft X-rays having a wavelength between approximately 0.13 nm and approximately 0.41 nm.

7. The method in accordance with claim 1, wherein the aerosol particles have a size smaller than approximately 60 nm.

8. The method in accordance with claim 1, wherein the aerosol particles are bioaerosol particles.

9. The method in accordance with claim 8, further comprising the steps of inactivating the bioaerosols by exposure to the generated discharge corona and X-ray irradiation.

10. The method in accordance with claim 9, wherein the electrostatic precipitator has interior walls coated with a photocatalytic material.

11. The method in accordance with claim 10, wherein the photocatalytic material is titanium dioxide or vanadium doped titanium dioxide.

12. The method in accordance with claim 1, wherein the X-ray emitter is disposed so as to irradiate the X-rays from a location not within an area defined between the discharge and the collecting electrodes.

13. The method in accordance with claim 1, wherein the X-ray emitter is disposed so as to irradiate the X-rays from a location outside a path of the received aerosol particles in the electrostatic precipitator.

14. The method in accordance with claim 1, wherein irradiating the aerosol particles X-rays simultaneous with applying a voltage between the electrodes capable of generating a corona discharge results in a direct charging and diffusion charging of the aerosol particles.

15. A method for enhanced charging of aerosol particles in a corona discharge generated in an electrostatic precipitator having a discharge electrode and a collecting electrode, comprising the steps of:

receiving the aerosol particles in the electrostatic precipitator;

applying a voltage between the electrodes of the electrostatic precipitator to generate the corona discharge; and simultaneously irradiating the aerosol particles in situ of the electrostatic precipitator with X-rays generated by an X-ray emitter, wherein the X-ray emitter is disposed so as to irradiate the X-rays through a hole defined in the collecting electrode.

16. The method in accordance with claim 15, further comprising a film covering the hole defined in the collecting electrode.

17. The method in accordance with claim 16, wherein the film is a polyimide film.

18. A system comprising:

an electrostatic precipitator for receiving aerosol particles, the electrostatic precipitator having a discharge electrode and a collecting electrode, the collecting electrode having a hole defined therethrough;

a power source for applying an electric field between the discharge and collecting electrodes to generate a discharge corona; and an X-ray emitter for generating X-rays, the X-ray emitter being dispose so that the aerosol particles are irradiated by the X-rays in situ through the hole defined in the collecting electrode.

19. The system in accordance with claim 18, further comprising a film covering the hole defined in the collecting electrode.

20. The system in accordance with claim 19, wherein the film is a polyamide film.

21. The system in accordance with claim 18, wherein the discharge corona is one of a unipolar discharge corona and a bipolar discharge corona.

22. The system in accordance with claim 21, wherein the corona is a negative unipolar corona discharge.

23. The system in accordance with claim 21, wherein the corona is a positive unipolar corona discharge.

24. The system in accordance with claim 18, wherein the X-rays have an applied voltage between approximately 3.5 keV and approximately 9.5 keV.

25. The system in accordance with claim 24, wherein the X-rays are soft X-rays having a wavelength between approximately 0.13 nm and approximately 0.41 nm.

26. The system in accordance with claim 18, wherein the aerosol particles have a size smaller than approximately 60 nm.

27. The system in accordance with claim 18, wherein the aerosol particles are bioaerosol particles.

28. The system in accordance with claim 27, wherein the electrostatic precipitator has interior walls coated with a photocatalytic material.

29. The system in accordance with claim 27, wherein the photocatalytic material is titanium dioxide or vanadium doped titanium dioxide.

30. A system comprising:
- an electrostatic precipitator for receiving aerosol particles, the electrostatic precipitator having a discharge electrode and a collecting electrode;
- a power source for applying an electric field between the discharge and collecting electrodes to generate a discharge corona; and
- an X-ray emitter for generating X-rays, the X-ray emitter being disposed so that the aerosol particles are simultaneously irradiated by the X-rays in situ from a location outside a path of the received aerosol particles in the electrostatic precipitator.

31. The system in accordance with claim 30, wherein irradiating the aerosol particles with X-rays simultaneous with applying a voltage between the electrodes capable of generating a corona discharge results in a direct charging and diffusion charging of the aerosol particles.

* * * * *